United States Patent
Pigg et al.

(10) Patent No.: US 10,134,019 B2
(45) Date of Patent: *Nov. 20, 2018

(54) TRANSACTION DECISIONING BY AN AUTOMATED DEVICE

(71) Applicant: Bank of America Corporation, Charlotte, NC (US)

(72) Inventors: Charles F. Pigg, Plano, TX (US); Paul Cooley, San Diego, CA (US); Roberto J. Dominguez, High Point, NC (US); Tommi Levi, Charlotte, NC (US); Paul Martin Mattison, Sr., Sherrills Ford, NC (US)

(73) Assignee: Bank of America Corporation, Charlotte, NC (US)

( * ) Notice: Subject to any disclaimer, the term of this patent is extended or adjusted under 35 U.S.C. 154(b) by 323 days.

This patent is subject to a terminal disclaimer.

(21) Appl. No.: 14/731,585

(22) Filed: Jun. 5, 2015

(65) Prior Publication Data
US 2016/0358141 A1    Dec. 8, 2016

(51) Int. Cl.
*G06Q 20/10* (2012.01)
*G06Q 20/04* (2012.01)
*G06Q 20/40* (2012.01)

(52) U.S. Cl.
CPC ....... *G06Q 20/1085* (2013.01); *G06Q 20/042* (2013.01); *G06Q 20/405* (2013.01); *G06Q 20/4016* (2013.01)

(58) Field of Classification Search
None
See application file for complete search history.

(56) References Cited

U.S. PATENT DOCUMENTS

| | | |
|---|---|---|
| 7,529,710 B1 | 5/2009 | Clower et al. |
| 8,381,975 B2 | 2/2013 | Davila et al. |
| 8,959,033 B1* | 2/2015 | Oakes, III .......... G06K 9/00161 235/379 |
| 2005/0015341 A1* | 1/2005 | Jackson ................. G06Q 20/04 705/45 |
| 2006/0202012 A1 | 9/2006 | Grano et al. |
| 2007/0084911 A1 | 4/2007 | Crowell |
| 2008/0249931 A1 | 10/2008 | Gilder et al. |

(Continued)

OTHER PUBLICATIONS

Aug. 10, 2017—(U.S.) Non-Final Office Action—U.S. Appl. No. 14/731,560.

(Continued)

*Primary Examiner* — Robert R Niquette
(74) *Attorney, Agent, or Firm* — Banner & Witcoff, Ltd.; Michael A. Springs

(57) ABSTRACT

Methods, systems, and computer-readable media for determining whether a check may be cashed at an automated teller machine (ATM) are provided. A user may request to cash a check at an ATM and check image data may be transmitted to a return deposit item computing platform. The computing platform may identify an account number of the account on which the check is drawn. Transaction data associated with the account may be retrieved by the computing platform and a number of occurrences of returned deposit items may be identified. The number of occurrences may be used to determine whether the check should be cashed.

17 Claims, 14 Drawing Sheets

(56) References Cited

U.S. PATENT DOCUMENTS

| | | | | |
|---|---|---|---|---|
| 2011/0066529 A1* | 3/2011 | Larsen | ................... | G06Q 40/02 |
| | | | | 705/30 |
| 2012/0023017 A1* | 1/2012 | Votaw | ................ | G06Q 20/1085 |
| | | | | 705/43 |
| 2014/0122341 A1* | 5/2014 | Hawkins | ................ | G06Q 20/04 |
| | | | | 705/45 |

OTHER PUBLICATIONS

Jan. 18. 2018—(US) Final Office Action—U.S. Appl. No. 14/731,560.

* cited by examiner

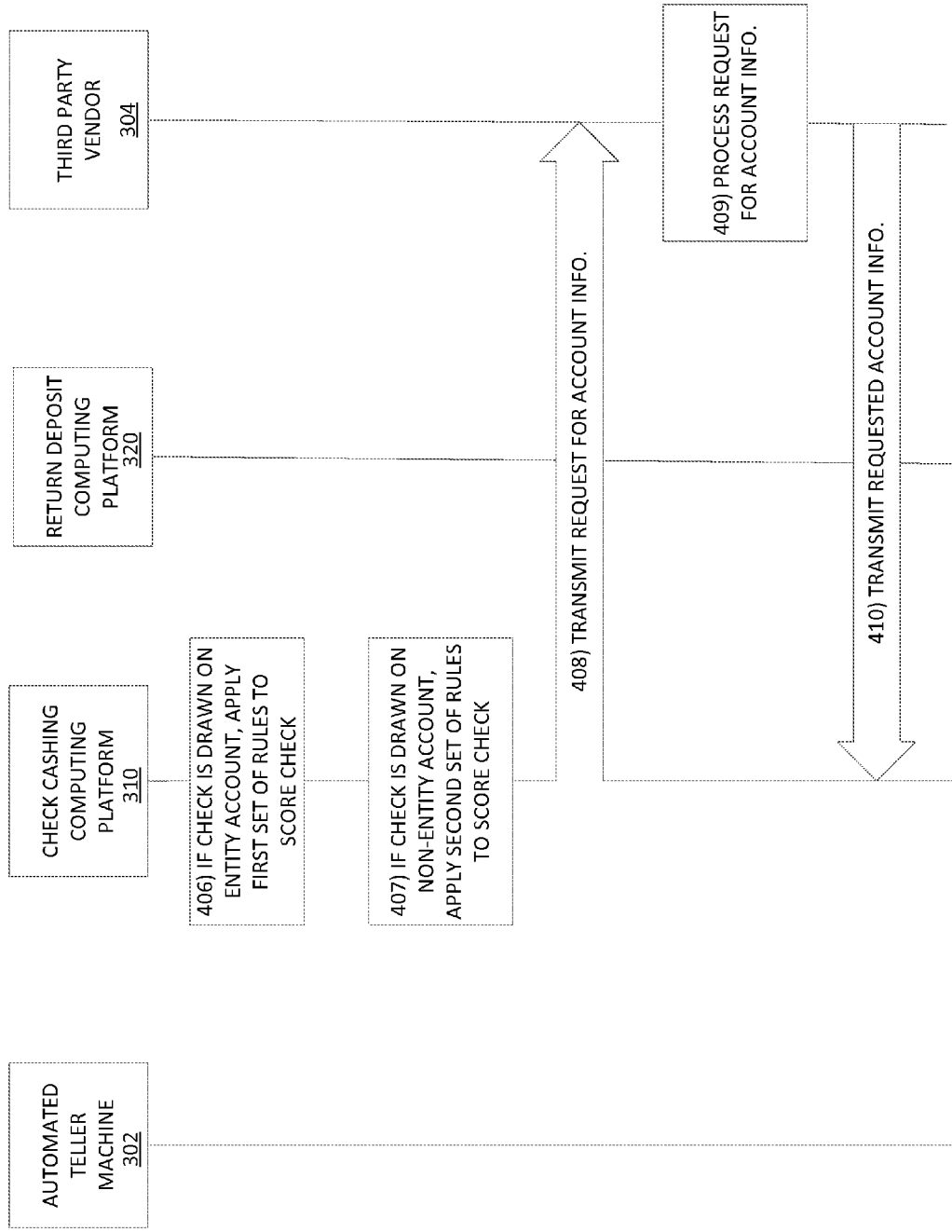

TRANSACTION DECISIONING BY AN AUTOMATED DEVICE

BACKGROUND

Aspects of the disclosure relate to computer hardware and software. In particular, one or more aspects of the disclosure generally relate to computer hardware and software for determining whether to cash a check at, for instance, an automated transaction device.

Financial institutions are often looking for ways to make banking and conducting financial transactions easier and more efficient for users. Increasing the functionality provided by existing banking channels, such as automated teller machines, is one way of improving efficiency. Many conventional automated teller machines do not provide check cashing functionality (e.g., inserting a check into the automated teller machine and, in the same transaction, getting an exact amount of the check dispensed to the user). Generally, this may be for several reasons. For instance, conventional automated teller machines generally lack the capability to reliably assess the possibility of unauthorized activity when cashing a check. In one example, when a check is cashed at a teller, the teller may ask for photo identification in order to confirm the identification of the person cashing the check. This may aid in avoiding unauthorized check cashing transactions. In another example, conventional automated teller machines have often not had the speed or computing capability to efficiently determine whether the check has already been presented for cashing or deposit, whether the check is counterfeit, or the like.

SUMMARY

Aspects of the disclosure relate to various systems and techniques for determining whether a check may be cashed at, for instance, an automated teller machine. In some examples, a user may request to cash a check at an automated teller machine (ATM) and the physical check may be received by the ATM. The ATM may capture check image data from the face of the check (e.g., routing number, account number, payor, payee, amount, and the like) and may transmit that information to a return deposit item computing platform for further processing.

In some arrangements, the return deposit item computing platform may receive the check image data and identify an account number of the account on which the check is drawn. Historical transaction data associated with the account may then be retrieved by the computing platform and a number of occurrences of returned deposit items may be identified. If the number of occurrences is at or above a threshold, the request to cash the check may be denied. If the number of occurrences is below the threshold, the check may be cashed and funds dispensed to the user.

In some examples, historical transaction data associated with the payee and/or the payor may be retrieved. The number of occurrences of returned deposit items associated with the payee and/or payor may be determined and, in some instances, an amount associated with each occurrence. Based on this information, a return deposit item score may be determined for the payee and/or the payor. If the return deposit item score is at or above a threshold, the request to cash the check may be denied. If the return deposit item score is below the threshold, the check may be cashed and funds dispensed to the user.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 4A-4D depict an illustrative event sequence for determining whether a check should be cashed in accordance with one or more example arrangements;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
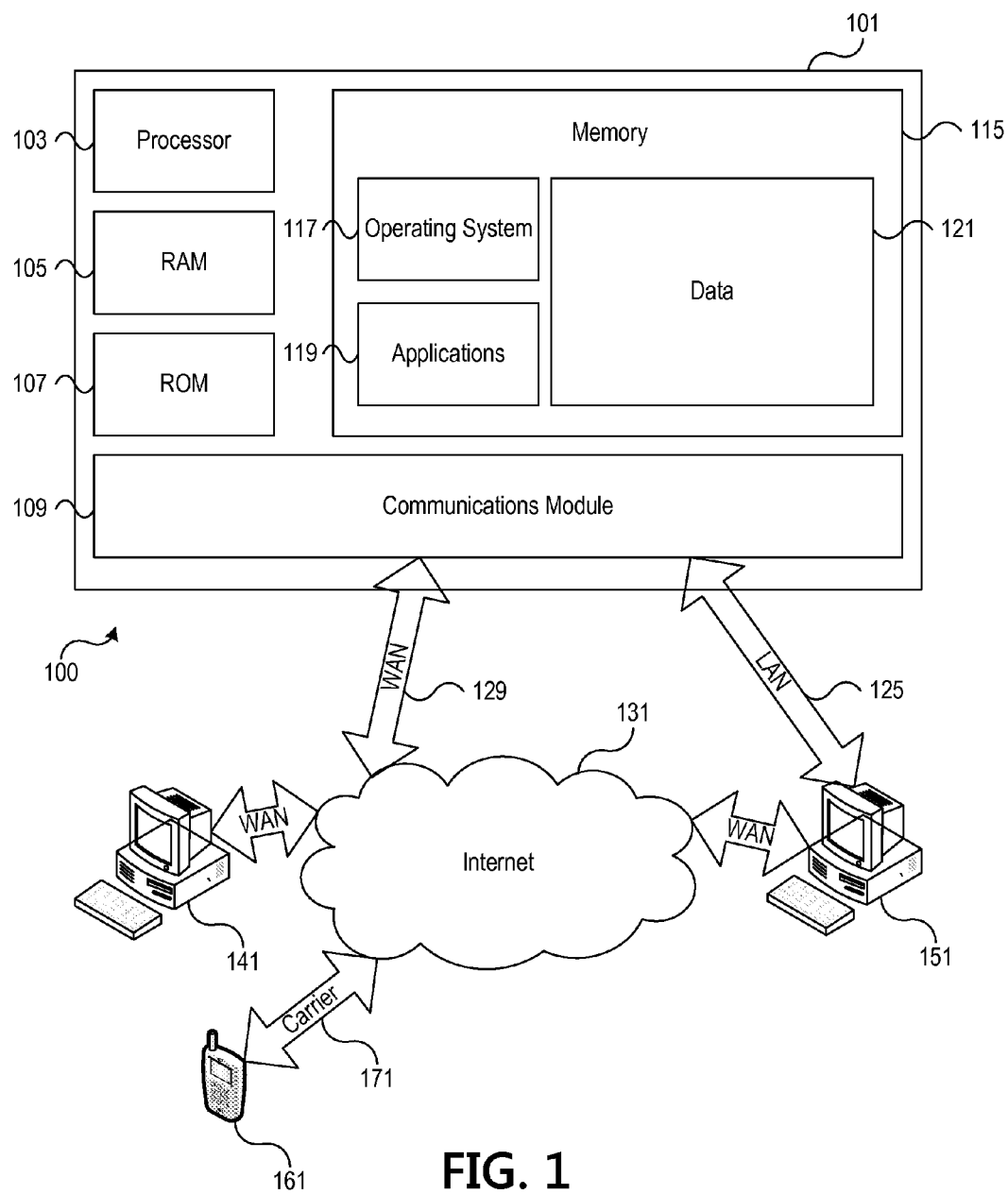
FIG. 1 depicts an illustrative operating environment in which various aspects of the disclosure may be implemented in accordance with one or more example arrangements.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks) are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
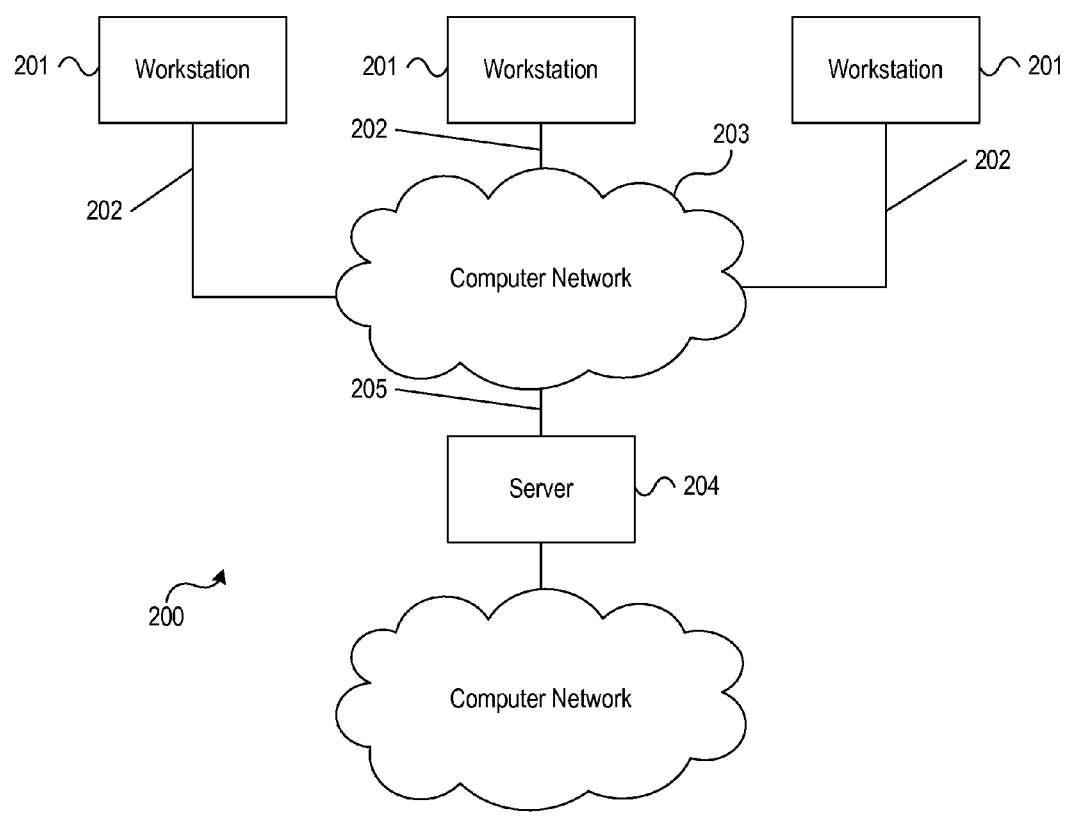
FIG. 2 depicts an illustrative block diagram of workstations and servers that may be used to implement the processes and functions of certain aspects of the present disclosure in accordance with one or more example arrangements.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
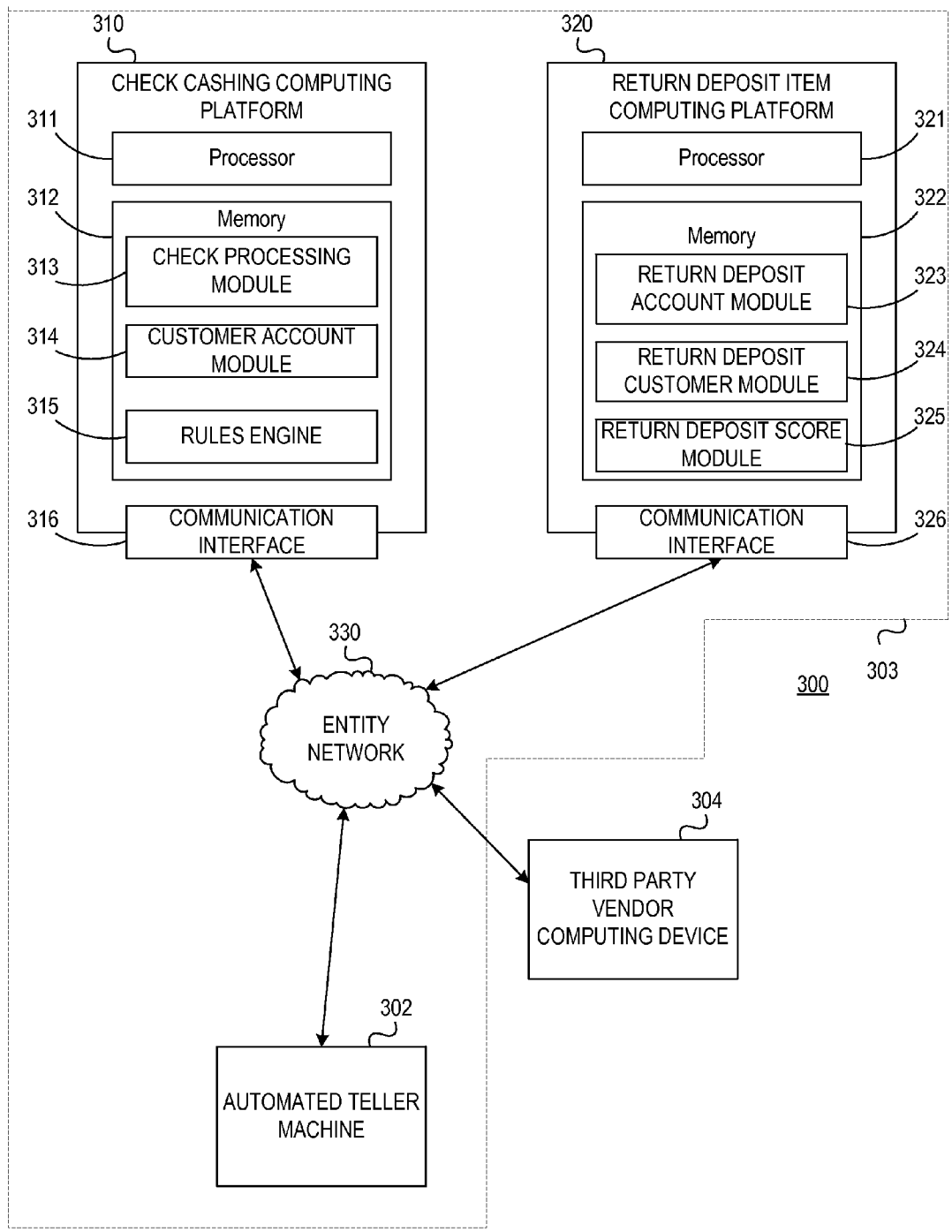
FIG. 3 depicts an illustrative computing environment for determining whether a check should be cashed in accordance with one or more example arrangements.

FIG. 3 depicts an illustrative computing environment for processing check cashing requests at an automated transaction device, such as an automated teller machine (ATM), in accordance with one or more example embodiments. In some examples, some or all of the devices described with respect to FIG. 3 may be associated with and/or implemented by an entity 303, such as a financial institution. Entity 303 may be various other types of entities (e.g., government entity, university, corporate entity, or the like) without departing from the invention. Various example arrangements described herein will be provided in the context of the entity being a financial institution, however nothing in the disclosure is intended to limit the entity to only use by financial institutions.

Referring to FIG. 3, computing environment 300 may include one or more computing devices, such as an automated teller machine 302 and a third party vendor computing device 304. Automated teller machine 302 may, for example, be an ATM that is configured to dispense funds to customers, accept deposit items from customers, allow customers to view account balances, and/or automatically provide other functionalities to customers. In some instances, automated teller machine 302 may be operated by a financial institution to provide check cashing functionality by the ATM for one or more customers or users using one or more of the computer systems and/or other elements included in computing environment 300, as illustrated in greater detail below. In some examples, check cashing may include a request from a customer or user of the ATM to receive funds in an exact of full amount of a check (or other negotiable instrument) received from the user by the ATM in, for example, a single transaction (e.g., a check is inserted into the ATM and the amount of funds is dispensed without requiring the check to be deposited to an account). As will be discussed more fully herein, in some arrangements, a customer may be entitled to receive, at that time and from the ATM, the exact amount of funds indicated on the check. In other examples, the customer may receive an amount less than the amount indicated on the check while the remainder of the funds may be held and distributed at a later time, may be deposited to an account of the customer/user, or the like.

Automated teller machine 302 may be any type of computing device capable of receiving a user interface, receiving input via the user interface, and communicating the received input to one or more other computing devices and may include some or all of the components described with respect to computing device 101 in FIG. 1. For example, automated teller machine 302 may be a server computer, a desktop computer, laptop computer, tablet computer, smart phone, or the like having a memory, processor, and communication interface. As noted above, and as illustrated in greater detail below, automated teller machine 302 may be a special-purpose computing device configured to perform specific functions.

Computing environment 300 also may include one or more computing platforms. For example, computing environment 300 may include check cashing computing platform 310 and return deposit item computing platform 320. Check cashing computing platform 310 may include one or more computing devices configured to perform one or more of the functions described herein. For example, check cashing computing platform 310 may include one or more computers (e.g., laptop computers, desktop computers, servers, server blades, or the like) configured to perform specific functions within the check cashing computer platform. Similarly, return deposit item computing platform 320 may include one or more computing devices configured to perform one or more of the particular functions described herein. For example, account management computing platform 320 may include one or more computers (e.g., laptop computers, desktop computers, servers, server blades, or the like).

Computing environment 300 may further include third party vendor computing device 304. The third party vendor computing device 304 may include one or more computers (e.g., laptop computers, desktop computers, servers, server blades, or the like) and may be external to (e.g., generally not associated with) the entity 303. The third party vendor computing device 304 may be configured to communicate with one or more devices of the entity, such as ATM 302, check cashing computing platform 310, return deposit item computing platform 320, or the like, via one or more networks. In some examples, the third party vendor computing device 304 may store information associated with customers of entities other than entity 303. For instance, if a customer or user of ATM 302 is not a customer of entity 303 (e.g., does not have an account at financial institution entity 303) information about the customer or user may be requested from third party vendor computing device 304. The information may include account status of the customer, transaction history of the customer, and the like, as will be discussed more fully herein.

Computing environment 300 also may include one or more networks, which may interconnect one or more of automated teller machine 302, check cashing computing platform 310, return deposit item computing platform 320, and third party vendor computing device 304. For example, computing environment 300 may include entity network 330. Entity network 330 may include one or more sub-networks (e.g., LANs, WANs, or the like). Entity network 330 may be associated with a particular organization (e.g., entity 303 which may be a corporation, financial institution, educational institution, governmental institution, or the like) and may interconnect one or more computing devices associated with the entity 303. For example, automated teller machine 302, check cashing computing platform 310, and return deposit item computing platform 320 may be associated with the entity 303 (e.g., financial institution), and entity network 330 may be associated with and/or operated by the entity 303, and may include one or more networks (e.g., LANs, WANs, VPNs, or the like) that interconnect automated teller machine 302, check cashing computing platform 310, and return deposit item computing platform 320 and one or more other computing devices and/or computer systems that are used by, operated by, and/or otherwise associated with the organization.

Additional networks (not shown in FIG. 3) may also be used. For instance, one or more public networks, such as the Internet, may be used to connect one or more of the computing devices shown in FIG. 3. The public network may be used in addition to or in lieu of the entity network 330.

Check cashing computing platform 310 may include one or more processor(s) 311, memory 312, and communication interface 316. A data bus may interconnect processor(s) 311, memory 312, and/or communication interface 316. Communication interface 316 may be a network interface configured to support communication between check cashing computing platform 310 and entity network 330 and/or one or more sub-networks thereof. Memory 312 may include one or more program modules having instructions that when executed by processor(s) 311 cause check cashing computing platform 310 to perform one or more functions described herein and/or one or more databases that may store and/or otherwise maintain information which may be used by such program modules and/or processor(s) 311.

For example, memory 312 may include check processing module 313, which may include instructions that when executed by processor(s) 311 cause check cashing computing platform 310 to perform one or more functions described herein, such as instructions for processing a physical check received by an ATM, extracting information from the check (e.g., amount, routing number, and the like), determining whether a check cashing risk score is within a predetermined threshold, and the like, as will be discussed in greater detail below. Check processing module 313 may, in some examples, include instructions for scoring a physical check (or risk associated with cashing a physical check) based on various check criteria, and using the score of the check to determine whether the check will be cashed. In addition, memory 312 may include a customer account module 314 and a rules engine 315. Customer account module 314 may store and/or maintain information about one or more accounts held by the entity 303 (e.g., financial institution). For instance, customer account module 314 may store information related to account or transaction history, whether an account is in good standing, and the like.

Rules engine 315 may store and/or maintain information defining one or more processing rules that may be used by check cashing computing platform 310 in determining whether one or more checks received by an ATM can be cashed (e.g., whether an exact amount of funds indicated on the check can or will be provided to the user requesting the funds/check cashing). The rules may be based, in some examples, on whether an account from which the check is drawn is an account at the entity or an account at another, separate or different entity (e.g., a second financial institution different from the entity financial institution). Different rules may be applied to determine whether a check will be cashed based on whether the account is an entity account or an account of another financial institution. Rules applied may also be based on whether the user requesting the check cashing process is a customer (e.g., account holder) at the entity or is a customer of another, different financial institution and is using the entity ATM for convenience, or the like. Example rules to be applied may include an amount limit, whether an account is in good standing, whether a check has been previously presented for cashing or deposit, or the like.

Return deposit item computing platform 320 may include one or more processor(s) 321, memory 322, and communication interface 326. A data bus may interconnect processor(s) 321, memory 322, and/or communication interface 326. Communication interface 326 may be a network interface configured to support communication between return deposit item computing platform 320 and organization network 330 and/or one or more sub-networks thereof. Memory 322 may include one or more program modules having instructions that when executed by processor(s) 321 cause return deposit item computing platform 320 to perform one or more functions described herein and/or one or more data tables that may store and/or otherwise maintain information which may be used by such program modules and/or processor(s) 321. For example, memory 322 may include return deposit account information module 323, which may include instructions that when executed by the processor(s) 321 cause return deposit item computing platform 320 to perform one or more functions described herein, such as instructions for determining whether a request to cash a check will return the check instead of cashing the check based on an account history of the account on which the check is drawn, as will be discussed in greater detail herein. In addition, memory 322 may include return deposit item customer module 324 which may include instructions that when executed by the processor(s) 321 cause return deposit item computing platform 320 to perform one or more functions described herein, such as instructions for determining whether a request to cash a check will return the check instead of cashing the check based on historical data of a user associated with the account on which the check is drawn, as will be discussed in greater detail herein. Memory 32 may further include a return deposit score module 325 which may include instructions that when executed by the processor(s) 321 cause return deposit item computing platform 320 to perform one or more functions described herein, such as instructions to determine a score associated with one or both of an account on which a check being cashed is drawn and a customer associated with the check to determine a likelihood or probability that the check will be returned based on historical data.

Figure 4A:
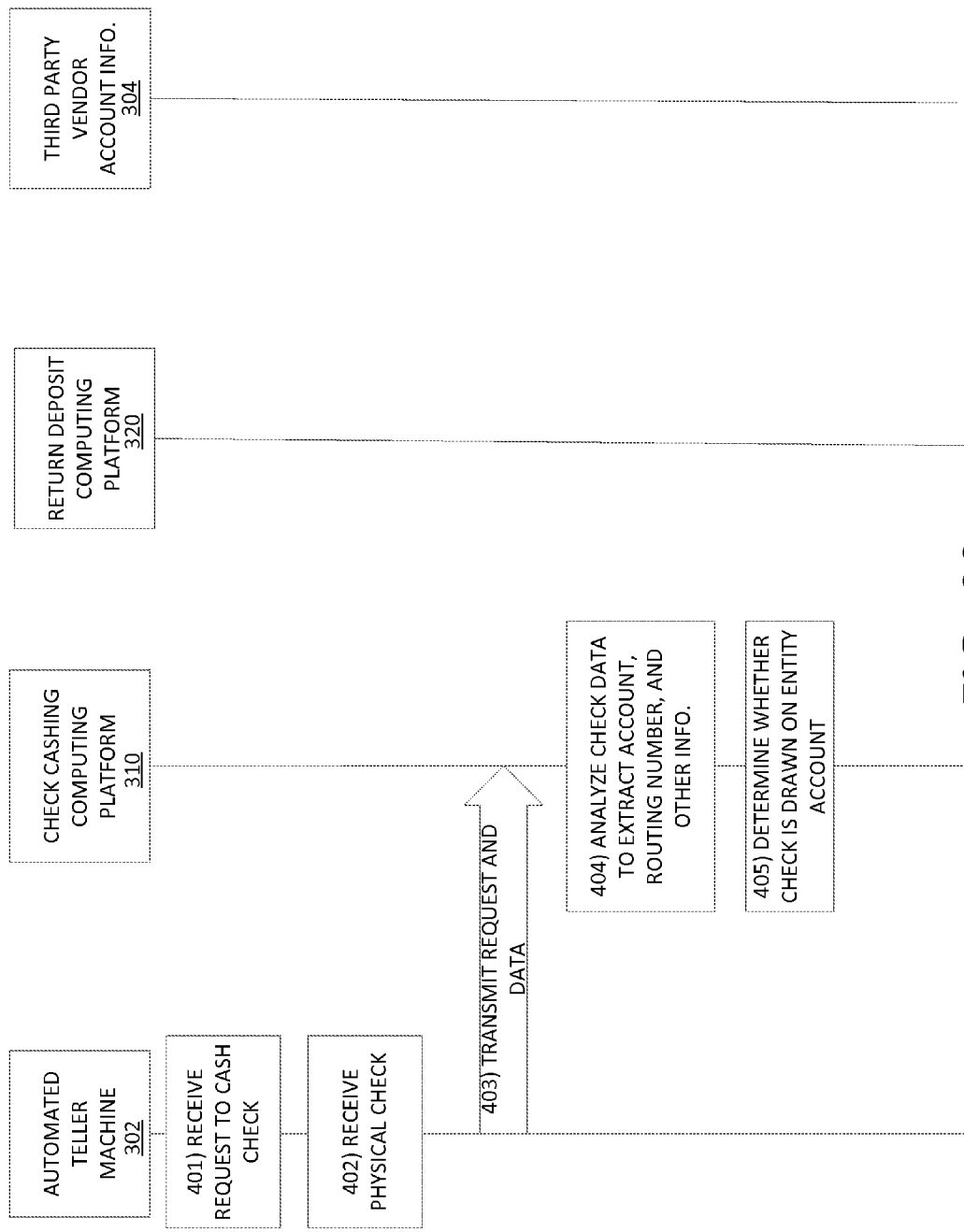

FIGS. 4A-4D depict an illustrative event sequence for determining whether a check will be cashed in accordance with one or more example arrangements discussed herein. Referring to FIG. 4A, at step 401, automated transaction device, such as automated teller machine (ATM) 302 may receive input requesting to cash a check or other negotiable instrument. For example, at step 401, automated teller machine 302 may receive input from a user of automated teller machine 302 (who may, e.g., be a customer of a financial institution operating automated teller machine 302) via one or more graphical user interfaces presented by automated teller machine 302 (e.g., on a display screen of automated teller machine 302), and such input may command and/or otherwise request automated teller machine 302 to receive a physical check or other negotiable instruction and perform a transaction including cashing the check. In some instances, automated teller machine 302 may receive such input after authenticating the user of automated teller machine 302 (e.g., based on a debit card, ATM card, or credit card presented by the user of automated teller machine 302, based on a PIN number entered by the user of automated teller machine 302, based on a one-time passcode entered by the user of automated teller machine 302, and/or based on one or more other credentials provided by the user of automated teller machine 302).

At step 402, automated teller machine 302 may receive the physical check associated with the request to cash the check. In some examples, receiving the physical check may include capturing an image of the check. For example, at step 402, automated teller machine 302 may capture check image data of the check presented for cashing by the user of automated teller machine 302. Automated teller machine 302 may, for instance, capture the image data of the check using one or more cameras, scanners, and/or the like that may be included in and/or coupled to automated teller machine 302, which may produce and/or provide check image data to one or more processors and/or memory units included in automated teller machine 302. At step 403, automated teller machine 302 may transmit check image data to check cashing computing platform 310. For example, at step 403, automated teller machine 302 may transmit to check cashing computing platform 310 the image data of the check captured by automated teller machine 302 at step 402, so as to facilitate processing of the check (e.g., by the financial institution that may operate automated teller machine 302 and/or check cashing computing platform 310), as illustrated in greater detail below.

At step 404, check cashing computing platform 310 may receive the check image data from automated teller machine 302 and may analyze the received data to extract check information, such as an amount of the check, an account number on which the check is drawn, an account holder associated with the check (e.g., payor), a routing number associated with the account number of the check, a person to whom the check is payable (e.g., payee), and the like. For example, at step 404, check cashing computing platform 310 may receive, via a communication interface (e.g., communication interface 316), and from a computing device (e.g., automated teller machine 302), image data of a check captured by the computing device (e.g., automated teller machine 302) and may analyze that data to extract data that may be used to score or otherwise determine whether the check may be cashed at the ATM 302. In some examples, analyzing the received data may include reading a magnetic ink character recognition (MICR) line on the check. Additionally or alternatively, analyzing the received data may include extracting data using one or more optical character recognition (OCR) techniques in some instances.

At step 405, a determination is made, based on the analyzed and extracted data in step 404, as to whether the check being cashed (or associated with the cashing request) is drawn on an account of the entity (e.g., the entity operating the ATM 302). If so, a rules engine (e.g., rules engine 315) may apply a first set of rules to the check to determine whether the check may be cashed, as shown in step 406 in FIG. 4B. In some examples, and as will be discussed more fully herein, the first set of rules may include determining whether the account on which the check is drawn is in good standing, determining whether an amount of the check exceeds a pre-determine amount limit for check cashing, and/or determining whether the check has been previously presented for cashing or deposit (e.g., using the serial number, account number, and routing number, for instance).

If, in step 405, it is determined that the check is not drawn on an account of the entity (e.g., is drawn on an account of another entity, such as a second, different financial institution), the rules engine (e.g., rules engine 315) may apply a second set of rules to determine whether the check may be cashed, as shown in step 407. The second set of rules may be different from the first set of rules. In some examples, some rules applied in the first set of rules may be the same as or substantially similar to some rules applied in the second set of rules. Stated differently, the first set of rules and the second set of rules may, in some instances, have one or more rules in common. However, the second set of rules may differ from the first set of rules (e.g., may include additional or fewer rules or steps, may have a rule applied in a different manner, or the like).

If the second set of rules is applied, a request for account information may be transmitted to a third party vendor (e.g., third party computing device 304) in step 408. For instance, because the account on which the check is drawn is not an account held by the entity (e.g., first financial institution), the entity might not have sufficient information about the account to assess the risk associated with cashing the check. Accordingly, the entity may request account information from a third party vendor who stores and/or maintains information about various accounts. In step 409, the third party vendor computing device may process the request for information. Processing the request may include using the routing number, account number, name on the check, and the like, to identify the account on which the check is drawn. The device may then determine a status of the account. For instance, the account may be in good standing, may be closed, or may be open but not in good standing (in which case cashing the check would be high risk). This account information may be transmitted to the check cashing computing platform 310 in step 410 for use in scoring the risk associated with cashing the check at the ATM.

Figure 4C:
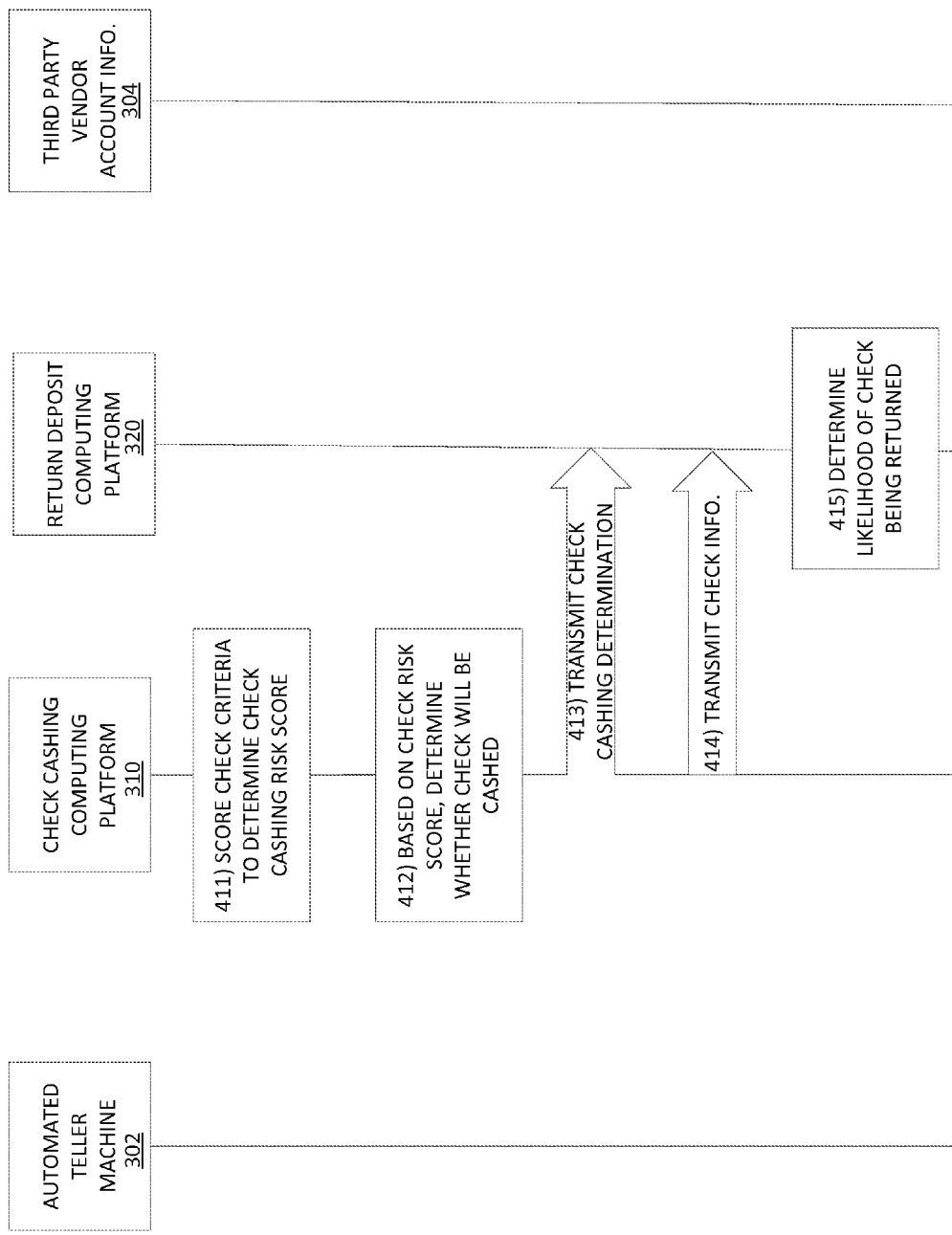
Figure 4D:
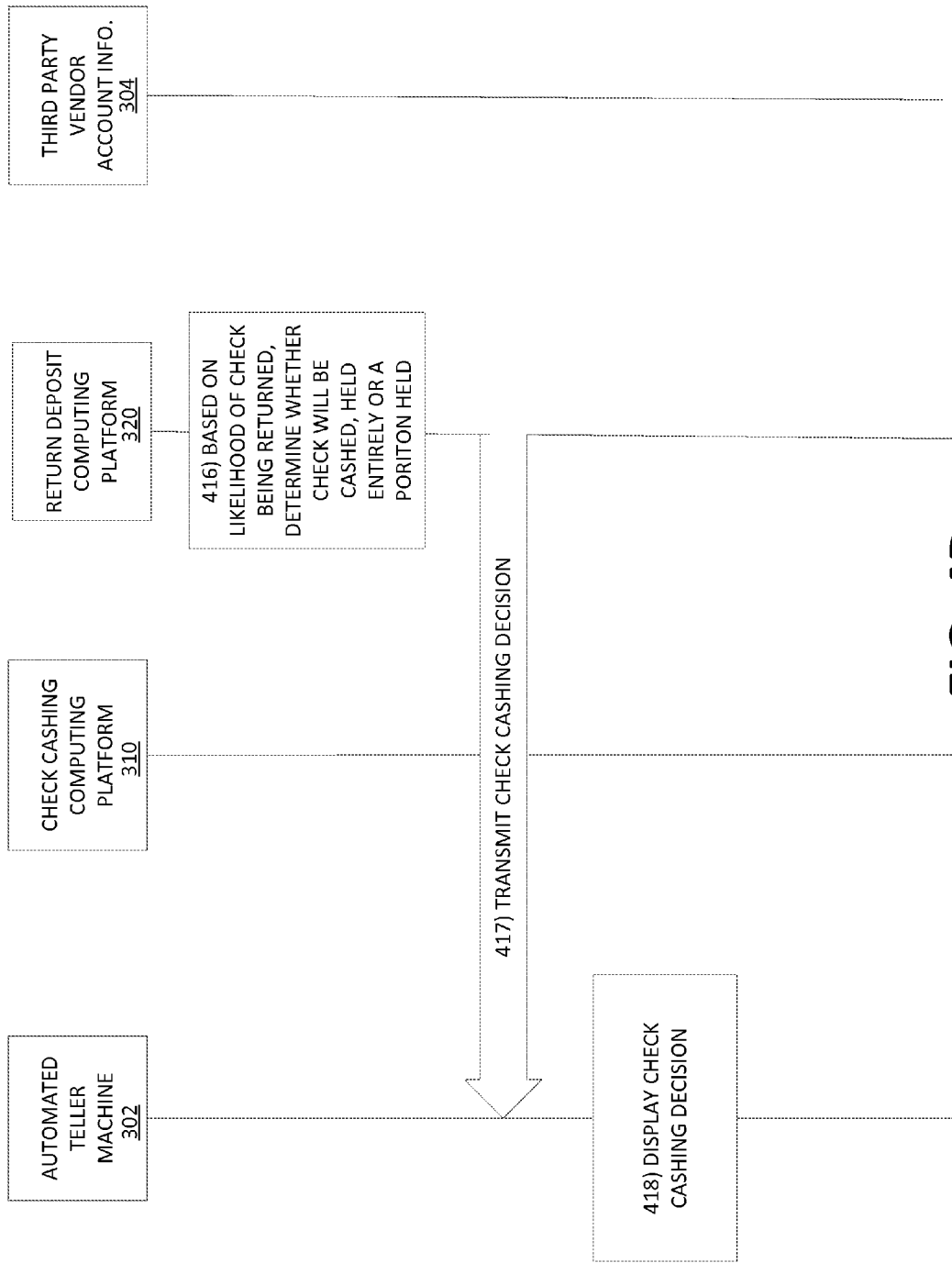

With reference to FIG. 4C, a plurality of check criteria may be scored to determine an overall check cashing risk score in step 411. As will be discussed more fully below, the rules applied (as discussed above) may each be associated with a scoring criterion. As each rule is applied to the check to evaluate the risk of cashing the check, a score for each criterion may be determined. The score for each criterion may be combined (e.g., summed) to determine an overall check cashing risk score for the check. For instance, in step 412, a determination may be made as to whether the overcall check cashing risk score is within one of a plurality of predetermined thresholds. For instance, if within a first threshold, the check may be cashed and funds in the exact or full amount of the check dispensed to the user. If within a second threshold different from the first threshold, the entire check may be held (e.g., check cashing at the ATM might not be permitted) or the transaction may be cancelled and the check returned to the user. If within a third threshold different from the first and second thresholds (or not within one of the first or second thresholds), a portion of the funds on the check may be provided while another portion may be held.

In some examples, the process may end there and the determination regarding check cashing may be transmitted to the ATM 302 and displayed on the ATM. In other arrangements, additional processing of the check may be conducted to evaluate a likelihood that the check may be returned (e.g., for inadequate amounts) that may factor into whether cashing of the check may be permitted. For instance, in step 413, the determination made by the check cashing computing platform regarding cashing the check may be transmitted to the return deposit item computing platform 320. In step 414, check information may also be transmitted to the return deposit item computing platform 320.

In step 415, a likelihood of the check being returned may be determined. This determination may be made in various ways and using various different types of data. For instance, in some arrangements, data may be received from a plurality of different sources. For instance, return deposit item data (e.g., returned checks, and the like) may be received from transactions performed via mobile banking applications, other ATM transactions, teller-based transactions, and the like. This data may be considered over a predefined period of time to assess risk associated with cashing a check at the ATM. In some arrangements, the data considered may include additional information, such as MICR line information (e.g., particular account associated with return items), dollar amount of returned items (e.g., small dollar amount returned items may be less risky than greater amounts), the financial institution associated with the returned items, and the like. This data may be received from a plurality of sources (e.g., databases associated with entity, public information, third party vendors, and the like) and may be aggregated to assess the risk of cashing the check.

Additionally or alternatively, assessing the likelihood that an item may be returned may be performed based on account transaction history of the account on which the check is drawn. For instance, data associated with the account may be reviewed (e.g., transaction history, history of inadequate amounts, history of negative consequences, and the like) and considered in determining a likelihood of the check being returned. In another example, transaction history of a user (e.g., payor or payee) associated with the check may be evaluated. For instance, history of inadequate amounts in any account of the user, negative consequences, and the like, that are specific to a user (e.g., could apply to multiple accounts associated with one user), in addition to historical data related to occurrences of returned deposit items associated with the payor or payee, may be used to assess likelihood of the check being returned. Accordingly, the system may rely on various sources of data and/or various different determining techniques to evaluate the item and decision whether to cash or hold the check (or a portion thereof). A hold on the check may include performing additional processing that may take one or more additional business days, such that the portion of the funds that is held may not be immediately available to the user. Instead, that portion may be available after the additional processing is performed (e.g., the next business day, three business days, or the like). Accordingly, the system may be customized such that a first check having an amount may be cashed but a second check having an exact same amount but drawn off another account or associated with another user might not be cashed because the risk or likelihood of the check being returned may be particular to the account, user, or the like. This provides for greater flexibility in check cashing capabilities.

Although the example described herein regarding returned deposit items is provided in the context of check cashing, a similar technique may be applied when decisioning items being deposited. For instance, a user may request to deposit an entire amount of funds into an account. The system may receive return deposit item data similar to that discussed above in order to determine whether the deposit should be performed right away, whether a portion of the item should be held (e.g., until funds clear), whether the entire amount should be held, and the like.

Although the return deposit item decisioning example discussed herein is presented as being performed in addition to a check cashing decision made by the check cashing computing platform 310, in some arrangements, the two processes may be performed individually or separately. That is, each process may be performed alone, without the other process, to formulate a check cashing or deposit decision and nothing in the specification should be viewed as limiting the two processes as only being performed together or being performed in any particular order.

Further, the decisioning steps described herein (both check cashing decisioning steps and return deposit item decisioning steps) may be performed in real-time or near real-time (e.g., while a person is performing the transaction at the ATM. Accordingly, because such a vast amount of data and information must be received and processed in a very short time period (in order to maintain the efficiency of ATM transactions) the processes described herein could not be performed without the particular computing devices and specially programmed devices described herein.

Figure 5:
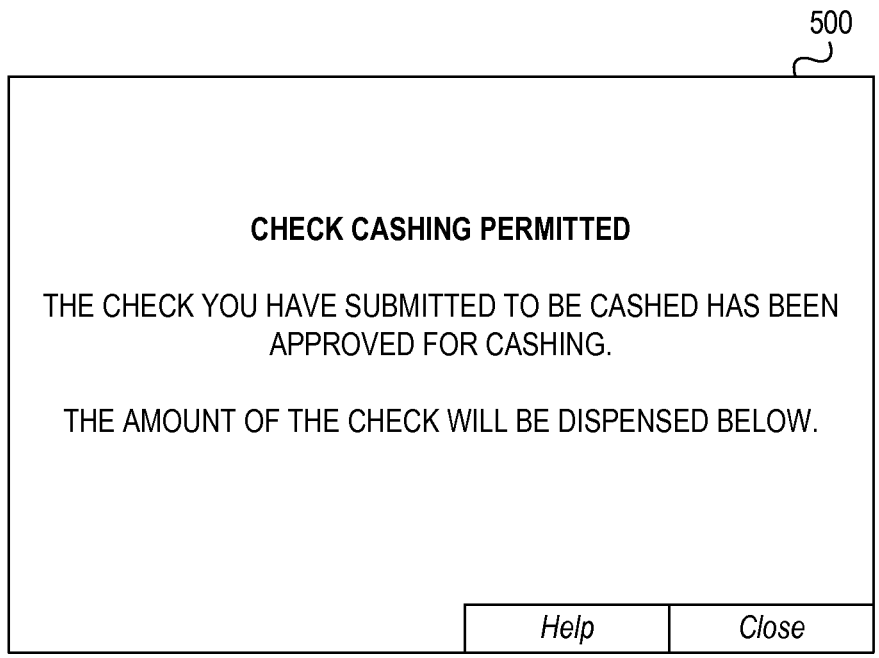
FIGS. 5-7 illustrate example graphical user interfaces for determining whether to cash a check and/or providing a decision regarding check cashing to a user in accordance with one or more example arrangements.

In step 417, the check cashing decision may be transmitted to the ATM and, in step 418, it may be displayed on a display of the ATM. For instance, FIG. 5 illustrates one example user interface that may be displayed via the ATM display. The interface 500 includes an indication that check cashing for the requested check or item has been authorized. The ATM will then dispense the full or exact amount of the check being cashed.

Figure 6:
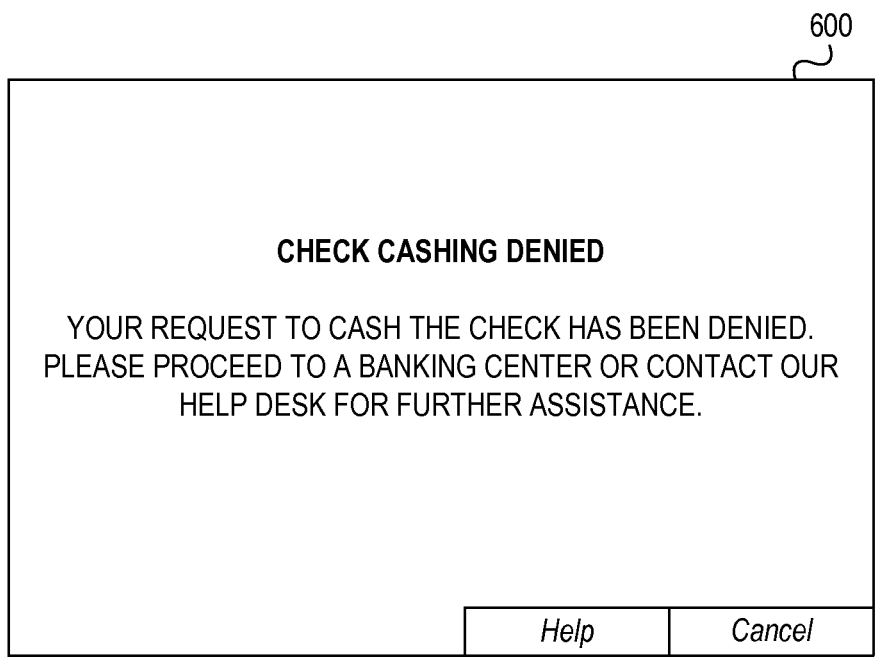

FIG. 6 illustrates an alternate arrangement including user interface 600. In the arrangement of FIG. 6, the user interface 600 indicates that the request to cash the check has been denied. In such arrangements, the physical check may, in some examples, be returned to the user. In other examples, the check may be held until the funds can be verified and, at that time, the amount of the check may be deposited into the user's account.

Figure 7:
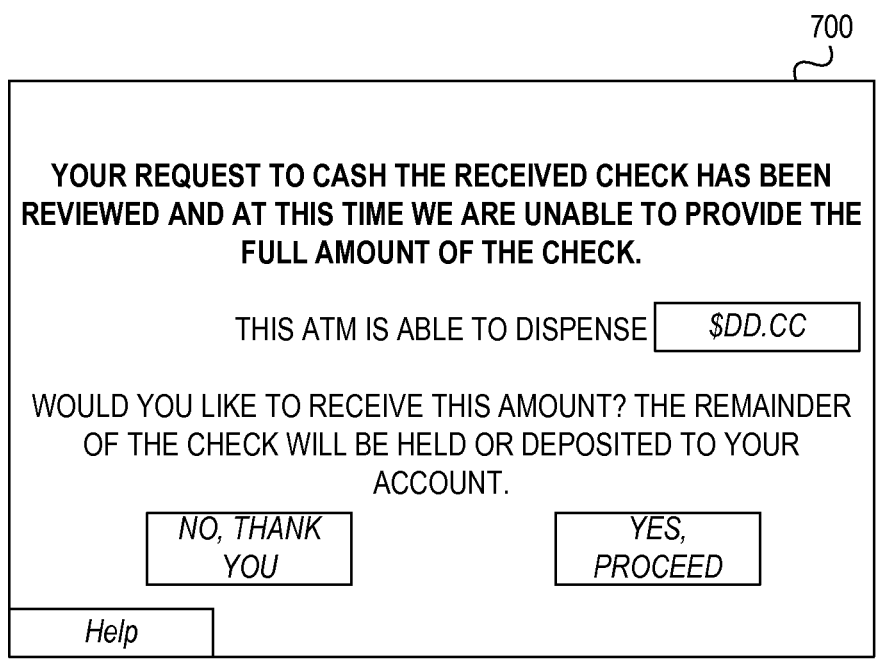

FIG. 7 illustrates yet another example user interface 700 providing a decision regarding a user's request to cash a check at an ATM. In the arrangement of FIG. 7, a portion of the funds may be provided to the user while another portion may be held by the financial institution or entity. For instance, a portion of the funds may be provided to the user (e.g., while conducting the transaction at the ATM) while another portion of the funds may require additional time to process (e.g., another business day, or the like). In such arrangements, the other portion of the funds may be made available to the user (e.g., via an account of the user) when the additional processing is completed (e.g., the next business day). In some examples, the portion that is held may be held because the requested check cashing amount is over a predetermined limit. In other examples, the portion may be held pending verification of availability of funds. In still other arrangements, a portion may be held because the ATM might not be configured to dispense funds in the amount of the check. For instance, at an ATM that is equipped to dispense only twenty dollar bills, a check in the amount of $23.48, for instance, might not be able to be cashed by that particular ATM. Accordingly, the interface 700 indicates an amount of funds that may be dispensed to the user, while the remainder of the amount of the check may be held or deposited. In some examples, the deposited funds might not be immediately available to the user (e.g., may be held for additional processing). The user may accept the reduced amount of funds for distribution by selecting "Yes, Please" option, or may cancel the transaction by selected "No, Thank You" option. Selection of the "No, Thank You" option may cause the physical check to be returned to the user.

Figure 8:
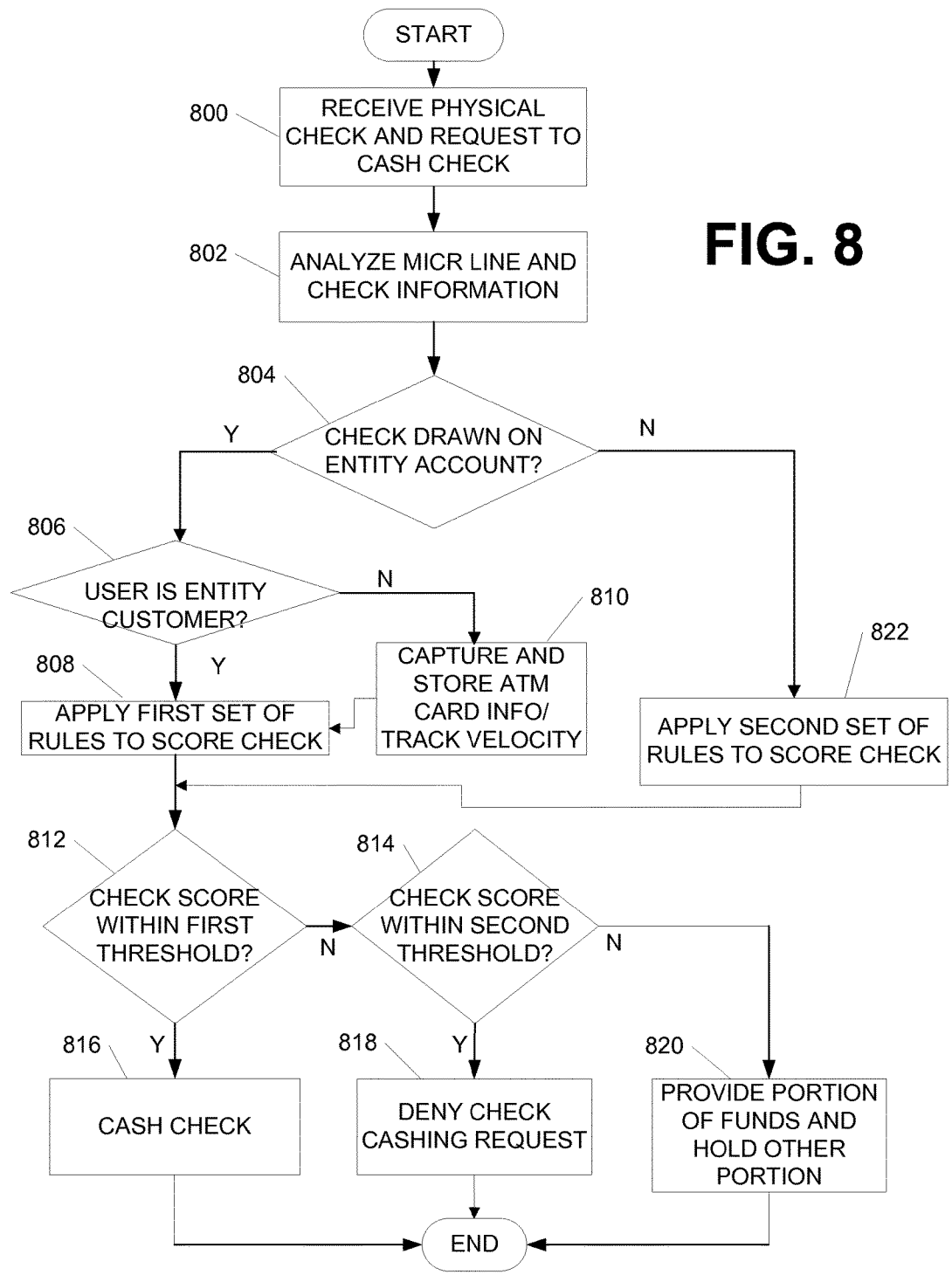
FIG. 8 illustrates one example method of determining whether a check may be cashed in accordance with one or more example arrangements.

FIG. 8 illustrates one example method of determining whether a check may be cashed at an automated transaction device, such as an ATM, according to one or more aspects discussed herein. The process described with respect to FIG. 8 may be performed by one or more of the specially programmed computing devices described herein. Further, various steps of the process may be optional or may be implemented with other arrangements described herein without departing from the invention.

In step 800, a physical check and request to cash the physical check may be received. As discussed herein, the check and request to cash the check may be received by an automated teller machine (ATM), such as ATM 302 in FIG. 3. In step 802, the check data may be evaluated and analyzed. For instance, check cashing computing platform 310 may analyze check data to extract information from the MICR line and/or from various other regions of the check. For instance, analyzing or reading the MICR line may provide a routing number of the financial institution on which the check was drawn, an account number of the account on which the check was drawn, a serial number of the check, and the like. Additionally or alternatively, information such as an amount of the check, payor of the check, payee of the check, and the like, may be determined by analyzing the check and/or check data (e.g., via optical character recognition).

In step 804, a determination may be made as to whether the check was drawn on an account of the entity implementing the system (e.g., entity 303). In some examples, the entity implementing the system may be a financial institution associated with the ATM at which the transaction is being performed. If the check is drawn on an account of the entity, a determination may be made as to whether the user attempting to cash the check (likely the payee of the check (e.g., the person to whom the check is made payable)) is a customer of the entity (e.g., whether the payee holds an account at the entity) in step 806. If not, the process may move to step 810 in which the ATM or other card information and/or authentication information used to initiate the transaction may be captured and stored by the ATM. For instance, a credit, debit or ATM card number of the user may be captured and stored, as well as any other identifying information available. Accordingly, if any unauthorized activity is performed, the user may be identified by the stored ATM information. In some examples, a velocity evaluation may be performed to determine whether the card used to initiate the check cashing transaction at the ATM was used more frequently than normal, whether the card was used in geographically disparate locations within a predetermined time period (e.g., whether a duplicate card is being used to conduct unauthorized transactions), and the like.

Once the information has been captured and stored, or if the user is determined to be a customer of the entity in step 806, a first set of rules may be applied (e.g., via rules engine 315 in FIG. 3) to score the risk level of cashing the check. For instance, as discussed herein, one or more criteria of the check may be scored and the sum of the scores may determine an overall check cashing risk score level of the check.

Figure 9:
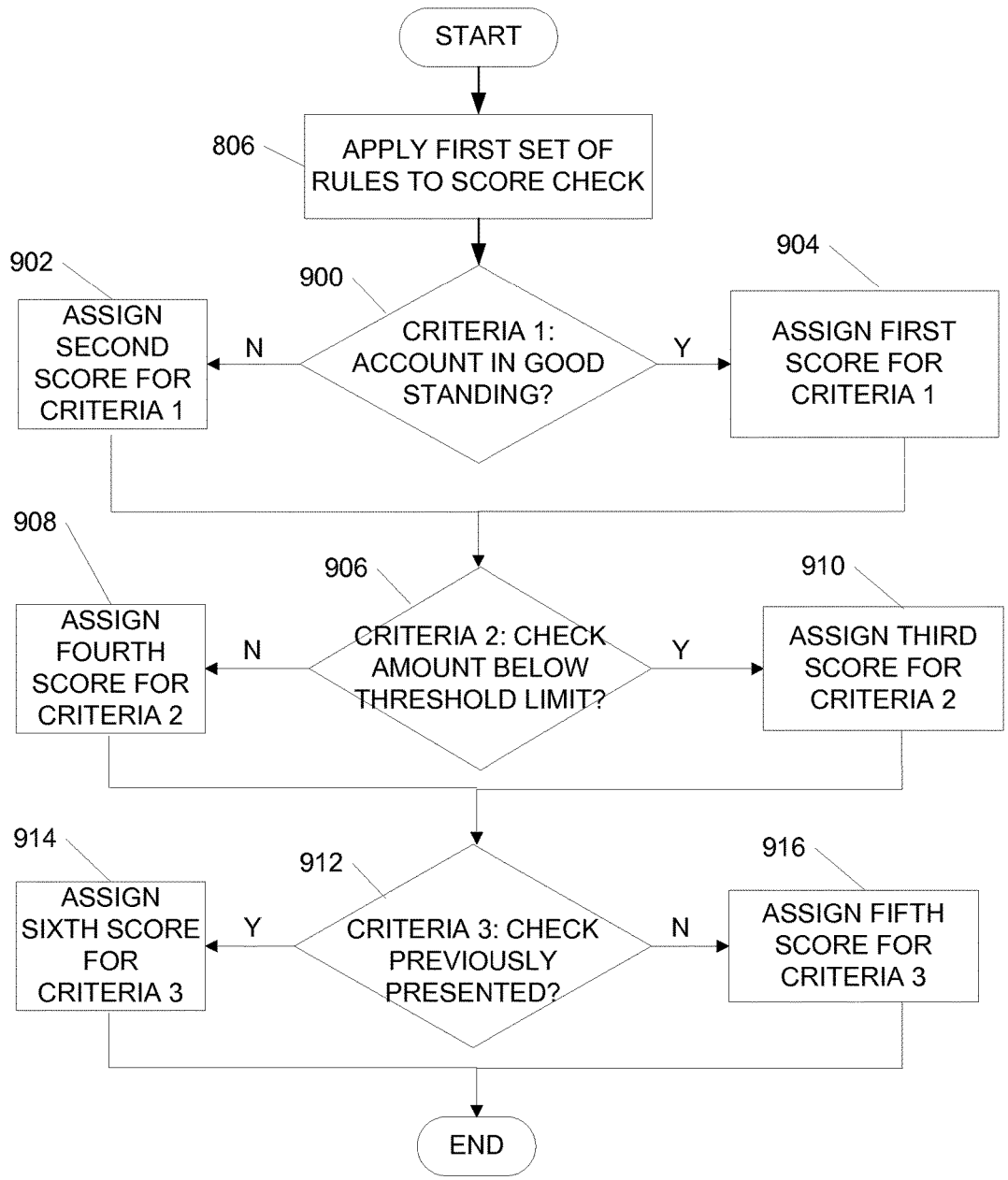
FIG. 9 illustrates one example method of applying a first rule set to determine a check cashing risk score in accordance with one or more example arrangements.

FIG. 9 illustrates one example method of applying the first rule set to a check to determine an overall check cashing risk score. The process begins with step 806 in FIG. 8 in which the first rule set is applied to the check. The process then moves to step 900 in which a first criterion is evaluated. Although three criteria are described with respect to FIG. 9, more or fewer criteria or rules may be applied. Also, the order in which the criteria are evaluated may be changed without departing from the invention. Further, various other criteria may be evaluated without departing from the invention. Nothing in the application should be viewed as limiting the criteria or rules applied to only those discussed with respect to FIG. 9.

In the example shown in FIG. 9, criterion 1 includes determining whether the account on which the check is drawn is currently in good standing. The system may request information from one or more systems, devices, databases, and the like, associated with the financial institution, to determine whether the account is in good standing. If so, the system will assign a first score to criterion 1 in step 904. If not, criterion 1 may be assigned a second score, different from the first score, in step 906. Once the score for the first criterion is determined, the process may move to applying another rule and evaluating another criterion.

In step 906, a second criterion is evaluated. For instance, the second criterion may include determining whether an amount of the check is below a threshold limit. In some examples, the threshold limit may vary based on the account holder. For instance, if the customer associated with the account is a long standing customer, has a history of being a good customer, has a predetermined amount of funds on deposit with the financial institution, or the like, that customer's threshold limit for check cashing may be higher than another customer who is a relatively new customer, or has a history of transaction issues (e.g., inadequate amount of funds for checks, negative consequences, or the like). Accordingly, the evaluation of criterion 2 may include receiving information from a plurality of sources within the financial institution to compare the check amount to a predetermined threshold limit. If the check is below the threshold limit, the system may assign a third score to criterion 2 in step 910. If the check is above the threshold limit, the system may assign a fourth score to criterion 2 in step 912. The fourth score may be different from the third score.

The system may then move to evaluation of another criterion (e.g., apply another rule) in step 912. For instance, in step 912, the system may determine whether the check was previously presented for deposit or cashing. The system may obtain the routing number, account number, and serial number of the check (e.g., from MICR line) and determine whether the check was previously presented via another ATM or another channel, such as a mobile banking application. If the check was not previously presented, the system may assign a fifth score to criterion 3 in step 916. If the check was previously presented, that may be an indication of unauthorized activity and a sixth score may be assigned to the third criterion in step 914.

In some examples, some or all of the criteria may be weighted in order to identify one or more criteria having increased significance. For instance, if the check was previously presented and the sixth score is assigned in step 914, that score may be weighted more heavily than other scores because it is likely that unauthorized activity is being performed. Various other weighting arrangements may be used without departing from the invention.

Once the scores of each criterion are determined, the overall check cashing risk score may be determined by summing the assigned scores. For instance, the overall check cashing risk score may be determined using:

Check cashing risk score=(Criterion 1 Score)+(Criterion 2 Score)+(Criterion 3 Score)

One or more weighting factors may be applied to any of the scores, as desired.

With further reference to FIG. 8, once the first set of rules has been applied, a category of the overall check cashing risk score may be determined. For instance, in step 812, a determination may be made as to whether the overall check cashing risk score is within a first threshold. If so, the check may be cashed in step 816 and funds may be dispensed from the ATM in the amount of the check (e.g., the exact or full amount of the check). If not, the process moves to step 814 in which a determination is made as to whether the overall check cashing risk score is within a second threshold. If so, the check cashing request may be denied in step 818. If the overall check cashing risk score is not within the second threshold, the system may move to step 820 in which a portion of the funds may be provided to the user and a portion may be held (e.g., pending verification of availability of funds, pending further confirmation of no unauthorized activity, or the like).

Figure 10:
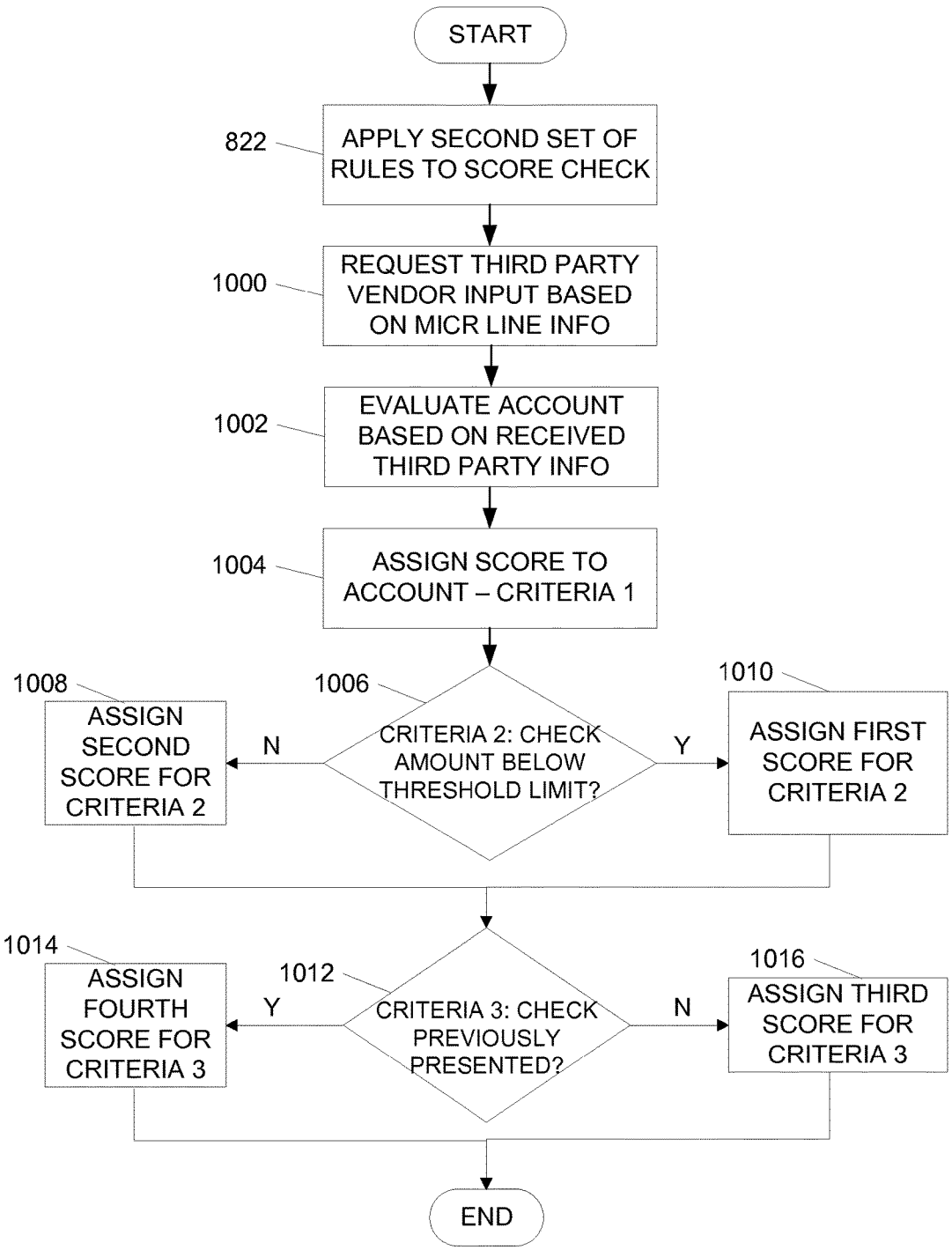
FIG. 10 illustrates one example method of applying a second rule set to determine a check cashing risk score in accordance with one or more example arrangements.

If, in step 804, a determination is made that the check being cashed is not drawn on an entity account (e.g., is drawn on an account of another entity or financial institution), the process may apply a second set of rules to score the check in step 822. FIG. 10 illustrates one example method of applying a second set of rules, different from the first set of rules, according to one or more aspects described herein. Similar to the arrangement of FIG. 9, the order in which the criteria are evaluated may be changed without departing from the invention. Further, various other criteria may be evaluated without departing from the invention. Nothing in the application should be viewed as limiting the criteria or rules applied to only those discussed with respect to FIG. 10.

The process begins with step 822 in FIG. 8 in which the second rule set is applied to the check. The process then moves to step 1000 in which account information is requested from a third party vendor. For instance, MICR line information may be read and transmitted to the third party vendor, who may use the information (e.g., routing number, account number, and the like) to identify the account on which check is drawn. In step 1002, the third party vendor information may be received by the system (e.g., check cashing computing platform 310) and evaluated. That is, the information provided by the third party vendor may be used to identify a status of an account. For instance, the information may identify whether the account is active or closed, whether there are any issues with the account which would cause the system to stop payments, and the like. Based on this information, the system may assign a score to a first criterion of the second rule set (e.g., status of account) based on the information provided by the third party vendor in step 1004.

The process may then continue to step 1006 in which a second criterion is evaluated. For instance, the system may determine, in step 1006, whether the check being cashed is below a threshold limit. If so, a first score may be assigned to the second criterion in step 1010. If not, a second score may be assigned to the second criterion in step 1008. Similar to the arrangement of FIG. 9, the threshold limit may be a standard, predetermined limit that is applied to all check cashing customers via this process. In other examples, the threshold limit may be customized to the user, account, or the like.

The process then moves to step 1012 and evaluates a third criterion. In the example shown in FIG. 10, the third criterion is whether the check has been previously presented. The system may obtain the routing number, account number, and serial number of the check (e.g., from MICR line) and determine whether the check was previously presented via another ATM or another channel, such as a mobile banking application. If the check was not previously presented, the system may assign a third score to criterion 3 in step 1016. If the check was previously presented, that may be an indication of unauthorized activity and a fourth score may be assigned to the third criterion in step 1014.

As discussed above with respect to FIG. 9, in some examples, some or all of the criteria may be weighted in order to identify one or more criteria having increased significance. For instance, if the check was previously presented and the fourth score is assigned in step 1014, that score may be weighted more heavily than other scores because it is likely that unauthorized activity is being performed. Various other weighting arrangements may be used without departing from the invention.

Once the scores of each criterion are determined, the overall check cashing risk score may be determined by summing the assigned scores, similar to the arrangement discussed above. The overall check cashing risk score may then be used to determine whether the check will be cashed by proceeding to step 812, as discussed above.

As discussed herein, the processes described with respect to FIGS. 8, 9, and 10, may be performed in real-time, or near real-time, such that the decisioning steps are performed while a user is conducting a transaction at the automated transaction device (e.g., ATM). Data is efficiently retrieved in real-time or near real-time from a plurality of sources and the computing devices described herein perform particular functions to evaluate the data and determine whether a check should be cashed or whether there is a risk of unauthorized activity.

Figure 11:
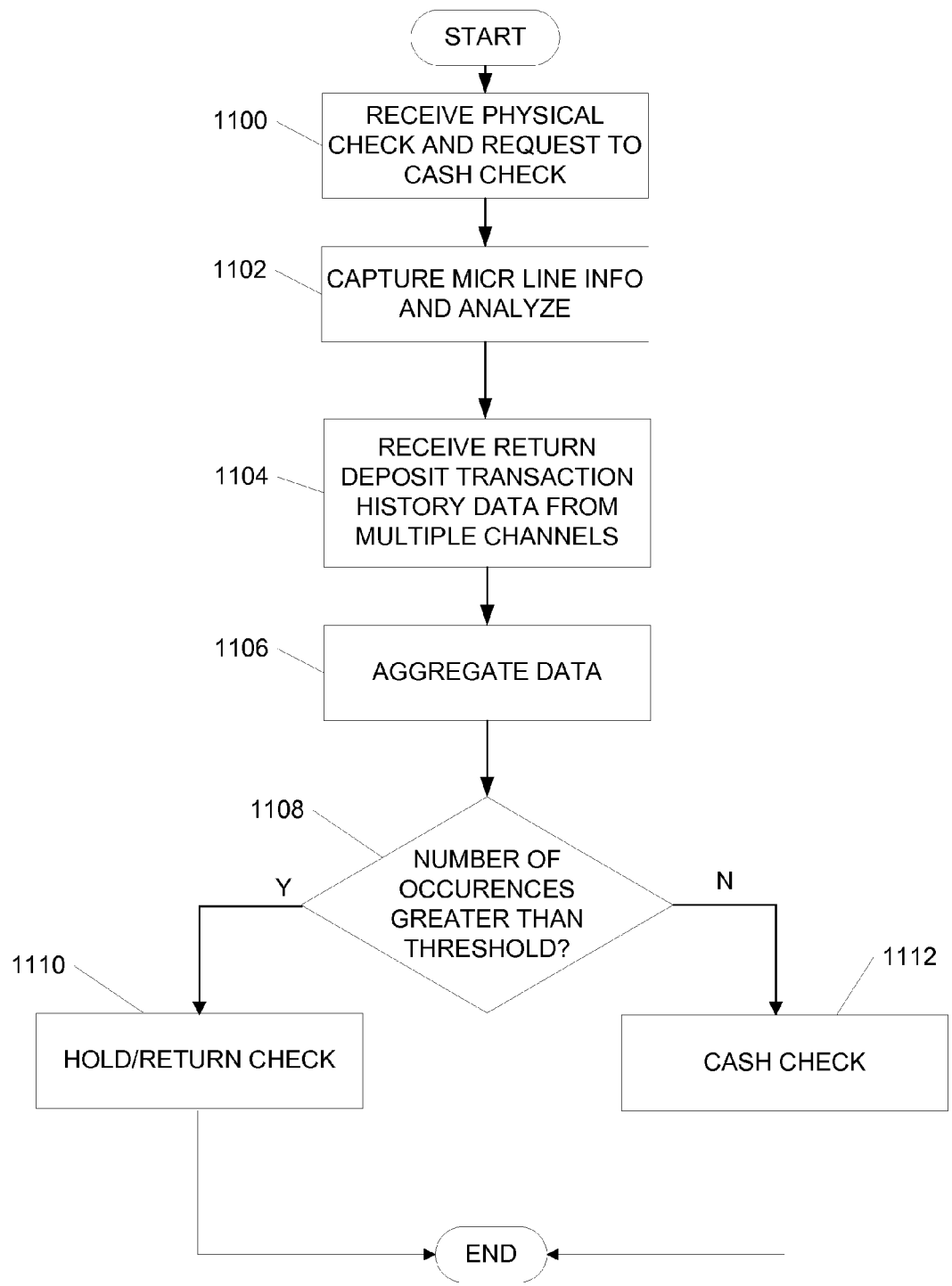
FIG. 11 illustrates one example method of using return deposit item information in determining whether a check should be cashed in accordance with one or more example arrangements.

FIG. 11 illustrates one example method of using return deposit item information in determining whether a check should be cashed at an automated transaction device, such as an ATM. In step 1100, a physical check and request to cash the check may be received by an ATM. Image data from the check (e.g., MICR line, payor information, amount, payee information, and the like) may be captured from the check by the ATM and analyzed (e.g., by return deposit item computing platform 320 in FIG. 3). For instance, the system may capture an account number, routing number, account holder name, payee name, and the like, and may identify the account on which the check is drawn, as well as a user associated with that account.

In step 1104, the identified information may be used to obtain historical transaction data of the account and/or account holder. For instance, transaction data from multiple sources may be received. That is, data from transactions performed via various channels (e.g., via a teller, via ATM, via a mobile banking application, or the like) may be received. The data may include information associated with the account, such as a number of occurrences of returned deposit items. The data may also include additional information about the returned items, such as a financial institution associated with the account, a dollar amount of the item, and the like. Data associated with returned items for the particular user (e.g., payee or payor) may also be received. The received data may be data for a predefined time period. For instance, the system may receive data for the previous month, six months, one year, or the like.

In step 1106, the received data may be aggregated and analyzed. Analyzing the data may include identifying a number of occurrences of returned deposit items and using that as a factor in a decision to cash the check. For instance, if there are frequent occurrences of returned deposit items for an account or user, that may indicate an increased risk associated with cashing the check. In step 1108, a determination is made as to whether a number of occurrences of returned deposit items within the predefined time period is greater than a threshold number of occurrences. In some examples, this decision may be made in real-time or near real-time (e.g., while the user is conducting the transaction at the ATM). If, in step 1108, the number of occurrences is below the threshold, the system may cash the check in step 1112 and dispense the funds. If, in step 1108, the number of occurrences is at or above the threshold, the system may deny the request to cash the check and, instead, may hold the check or, in some examples, offer to return the check to the user in step 1110.

Figure 12:
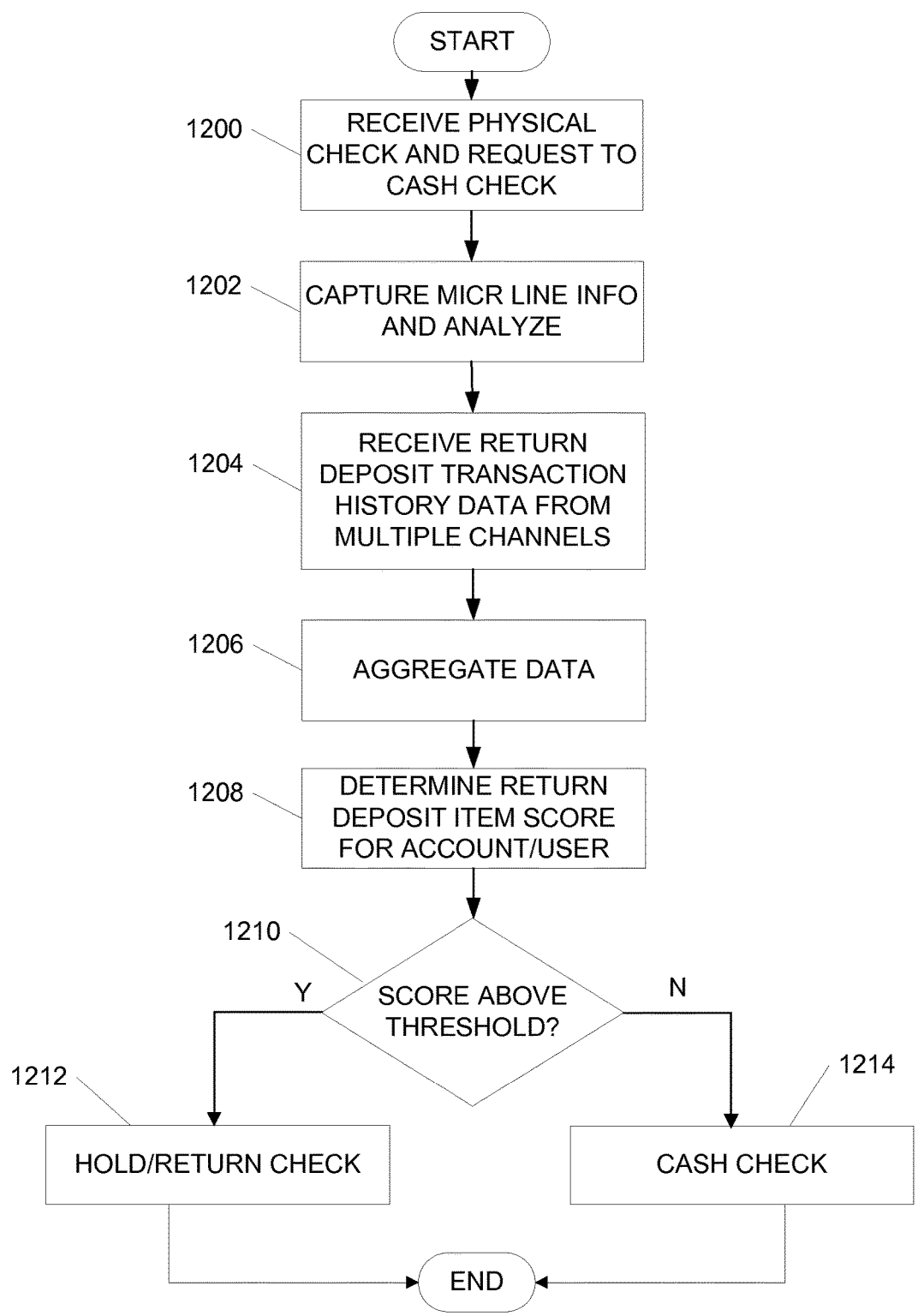
FIG. 12 illustrates another example method of using return deposit item information in determining whether a check should be cashed in accordance with one or more example arrangements.

FIG. 12 illustrates another example process for using return deposit item data in determining whether to cash a check at an automated transaction device, such as an ATM. In step 1200, a physical check and request to cash the check may be received by an ATM, such as ATM 302 in FIG. 3. In step 1202, check information may be captured and analyzed. For instance, similar to step 1102 in FIG. 11, check information such as account number, financial institution routing number, serial number, payor information, payee information, amount of the check, and the like, may be captured and analyzed. In step 1204, information associated with returned deposit items for the identified account, payor, and/or payee may be retrieved. For instance, occurrences of returned deposit items (such as a number of occurrences), as well as information associated with each occurrence may be received (e.g., amount, account, routing number, and the like). Similar to the arrangement described with respect to FIG. 11, the information may be received for transactions performed in any of various channels (e.g., via a teller, via an ATM, via a mobile banking application, via a banking kiosk, or the like). In some examples, additional transaction history data for the payor or payee may be received and used in the decisioning. The information may be retrieved for a particular predefined time period. For instance, data for the previous one month, six months, one year, or the like, may be received.

In step 1206, the received data may be aggregated. Aggregating the data may include aggregating the data from the multiple channels and sorting it by account, payor, payee, or the like. Based on the aggregated and sorted data, a return deposit item score may be determined for one or more of the account, the payor, and/or the payee. For instance, a number of occurrences for the account may be used to score the account (e.g., within a first threshold, a first score, within a second threshold, a second score, and the like). A similar process may be used to score the payor and payee based on the number of occurrences associated with each user, respectively, and/or additional information, such as an amount associated with each occurrence. In another example, the number of occurrences within the predefined time period may be used as the score.

In some examples, the score may be determined or calculated in real-time or near real-time, e.g., as the user is performing the transaction at the ATM. In other examples, the score may be a running score associated with the payor, payee, account, or the like. That is, the score for an account or user may be calculated on a period or aperiodic basis, may be updated as desired or on a periodic or aperiodic basis, and the like. The score may then be stored, such as in return deposit item computing platform 320, and retrieved upon receiving a request to cash a check at the ATM.

In step 1210, a determination is made as to whether the score is above a predetermined threshold. In some examples, the determination may be made in real-time or near real-time. If the score is below the threshold, the system may cash the check in step 1214 and dispense funds to the user. If the score is at or above the threshold in step 1210, the check may be held (e.g., until sufficient funds are verified, until potential for unauthorized access can be further evaluated, or the like) or returned to the user in step 1212. If the check is returned to the user, no additional processing may occur, the transaction at the ATM may be cancelled, and the user may proceed to attempt to cash the check via another channel (e.g., via a teller, a mobile banking application, or the like).

Although the arrangements of FIGS. 11 and 12 are described in the context of cashing a check at an ATM, the processes described may also be implemented if a check is being deposited at the ATM. That is, the determination is made as to whether to deposit the full amount of the check and make the full amount available for withdrawal upon deposit, or hold a portion or all of the check for a period of time to verify sufficiency of funds, verify no unauthorized access, or the like.

Although various aspects of the arrangements discussed herein are described in the context of an ATM, various other automated transaction devices may be used with the decisioning processes described herein without departing from the invention. For instance, the processes and systems described herein may be used with a banking kiosk, automated teller assistant (ATA), or the like.

As indicated above, the processes and systems described herein are described in the context of determining whether a check should be cashed. However, some or all of the aspects described herein may be used for other types of transactions, such as cashing other types of negotiable instruments, determining whether a full amount of a negotiable instrument should be deposited and the amount made immediately available for withdrawal, and the like. Nothing in the specification should be viewed as limiting the type of transaction to only check cashing.

As discussed herein, the systems and processes described improve the functionality of, for example, automated teller machines, by providing or improving the check cashing functionality of the devices. The processes and systems described provide an efficient manner of detecting potential unauthorized activity, using historical data to determine whether a check should be cashed and, in some examples, customize the criteria for determining whether a check should be cashed based on the particular user (payor or payee), account history, or the like. These processes may be performed in real-time, or near real-time, in order to effectively provide check cashing capabilities to a user conducting a transaction at an ATM.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines. In still other examples, the one or more computing platforms may be combined into the automated teller machine, and the various functions of each computing platform may be performed by the automated teller machine. In such arrangements, any and/or all of the above-discussed communications between computing platforms and/or the ATM may correspond to data being accessed, moved, modified, updated, and/or otherwise used by the ATM.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system, comprising:
   an automated teller machine (ATM) of a first financial institution, the ATM having at least a first processor and a first communication interface communicatively coupled to the at least a first processor, the ATM being configured to:
   receive a request to cash a physical check received by the ATM;
   capture check image data from a face of the check; and
   transmit, via the first communication interface, to a return deposit item computing platform, the check image data; and
   a return deposit item computing platform of the first financial institution, the return deposit item computing platform being connected to the ATM via a network of the first financial institution and including at least a second processor, a second communication interface communicatively coupled to the at least a second processor, and memory storing computer-readable instructions that, when executed by the at least a second processor, cause the return deposit item computing platform to:
   receive, via the second communication interface and from the ATM, the check image data;
   extract data first check data from the check image data using optical character recognition;
   identify, based on the check image data and by reading a magnetic ink character recognition line in the check image data, an account on which the check is drawn;
   retrieve historical transaction data associated with the account, the historical transaction data including occurrences of returned deposit items;
   determine, in real-time, a number of occurrences of returned deposit items associated with the account within a predefined time period;
   determine, in real-time, whether the number of occurrences of returned deposit items is at or above a predetermined threshold;
   responsive to determining that the number of occurrences is at or above the predetermined threshold, deny the request to cash the check; and
   responsive to determining that the number of occurrences is below the predetermined threshold, transmit, to the ATM, instructions to cash the check.

2. The system of claim 1, wherein the historical transaction data includes data from transactions conducted via a plurality of types of channels.

3. The system of claim 2, wherein the types of channels include at least one of: a teller transaction, an ATM transaction, and a transaction performed via a mobile banking application.

4. The system of claim 1, wherein denying the request to cash the check includes placing a temporary hold on the check by the first financial institution.

5. The system of claim 1, wherein denying the request to cash the check includes returning the physical check to a user requesting to cash the check.

6. The system of claim 1, wherein denying the request to cash the check includes dispensing a first portion of an amount of the check to a user requesting to cash the check and placing a hold on a second portion of the amount of the check, the first portion being less than a full amount of the check.

7. The system of claim 1, wherein the predefined time period is at least one month.

8. A system, comprising:
   an automated teller machine (ATM) of a financial institution, the ATM having at least a first processor and a first communication interface communicatively coupled to the at least a first processor, the ATM being configured to:
   receive a request to cash a physical check received by the ATM;
   capture check image data from a face of the check; and
   transmit, via the first communication interface, to a return deposit item computing platform, the check image data; and
   a return deposit item computing platform of the financial institution, the return deposit item computing platform being connected to the ATM via a network of the financial institution and including at least a second processor, a second communication interface communicatively coupled to the at least a second processor, and memory storing computer-readable instructions that, when executed by the at least a second processor, cause the return deposit item computing platform to:
   receive, via the second communication interface and from the ATM, the check image data;
   extract, from the check image data and using optical character recognition, a payee and a payor of the check;
   retrieve historical transaction data associated with at least one of the payee and the payor of the check, the historical transaction data including occurrences of returned deposit items;
   determine, in real-time, a number of occurrences of returned deposit items associated with the at least one of the payee and the payor of the check within a predefined time period;
   determine, in real-time and based on the number of occurrences of returned deposit items associated with the at least one of the payee and the payor of the check, a return deposit item score for the at least one of the payee and the payor of the check;
determine, in real-time, whether the return deposit item score is at or above a predetermined threshold;
responsive to determining that the return deposit item score is at or above the predetermined threshold, deny the request to cash the check; and
responsive to determining that the return deposit item score is below the predetermined threshold, transmit, to the ATM, instructions to cash the check.

9. The system of claim 8, wherein the historical transaction data further includes an amount associated with each occurrence of returned deposit items; and
further including instructions that, when executed, cause the return deposit item computing platform to:
determine, based on the number of occurrences of returned deposit items associated with the at least one of the payee and the payor of the check, and the amount associated with each occurrence of returned deposit items, the return deposit item score.

10. The system of claim 8, wherein the historical transaction data includes data from transactions conducted via a plurality of types of channels.

11. The system of claim 10, wherein the types of channels include at least one of: a teller transaction, an ATM transaction, and a transaction performed via a mobile banking application.

12. The system of claim 8, wherein denying the request to cash the check includes placing a temporary hold on the check by the financial institution.

13. The system of claim 8, wherein denying the request to cash the check includes returning the physical check to a user requesting to cash the check.

14. The system of claim 8, wherein denying the request to cash the check includes dispensing a first portion of an amount of the check to a user requesting to cash the check and placing a hold on a second portion of the amount of the check, the first portion being less than a full amount of the check.

15. A method, comprising:
at a return deposit item computing platform comprising at least one processor, memory, and a communication interface:
receiving, by the at least one processor, via the communication interface, and from an automated teller machine (ATM) of a financial institution, image data from a physical check received by the ATM;
receiving, by the at least one processor, via the communication interface and from the ATM, a request to cash the check;
extracting, from the check image data and using optical character recognition, a payee and a payor of the check;
retrieving historical transaction data associated with at least one of the payee and the payor of the check, the historical transaction data including occurrences of returned deposit items;
determining, in real-time, a number of occurrences of returned deposit items associated with the at least one of the payee and the payor of the check within a predefined time period;
determining, in real-time and based on the number of occurrences of returned deposit items associated with the at least one of the payee and the payor of the check, a return deposit item score for the at least one of the payee and the payor of the check;
determining, in real-time, whether the return deposit item score is at or above a predetermined threshold;
responsive to determining that the return deposit item score is at or above the predetermined threshold, denying the request to cash the check; and
responsive to determining that the return deposit item score is below the predetermined threshold, transmitting, to the ATM, instructions to cash the check.

16. The method of claim 15, wherein denying the request to cash the check includes returning the physical check to a user requesting to cash the check.

17. The method of claim 15, wherein denying the request to cash the check includes dispensing a first portion of an amount of the check to a user requesting to cash the check and placing a hold on a second portion of the amount of the check, the first portion being less than a full amount of the check.

* * * * *